United States Patent Office 3,145,115
Patented Aug. 18, 1964

3,145,115
INFRARED TRANSMITTING GLASSES
Robert A. Weidel, Webster, N.Y., assignor to Bausch & Lomb Incorporated, a corporation of New York
No Drawing. Filed May 15, 1959, Ser. No. 813,332
4 Claims. (Cl. 106—52)

The following invention relates to an improvement in infrared transmitting glasses. Particularly the invention is an improvement upon the known utility of calcium aluminate glasses containing a small percentage of iron.

Glasses of the so-called calcium aluminate type are those including major proportions of lime and alumina and less than about 10 mol percent silica. They are notoriously unstable and difficult to manufacture and to work. It has been found that the addition of iron to their compositions tends to improve their stability, and thereby to reduce the difficulties previously encountered in working with glasses of this type. More detailed information pertaining to calcium aluminate glasses is contained in an article, "Optical and Physical Properties of Some Calcium Aluminate Glasses," in the Journal of American Ceramic Society, vol. 41 (8), pp. 315–323 (1958).

Calcium aluminate glass usually includes a minor percentage of alkalis. A compound which contains copper may be partially substituted for the alkalis without impairing the glass stability.

It has been found that copper in the form of $CuO_{0.5}$ may be introduced as a replacement for alkali, and that the copper will be tolerated in a calcium aluminate glass in amounts equivalent to the combined alkalis formerly used. Where both alkali and iron are present in amounts producing maximum stability, $CuO_{0.5}$ is tolerated in a general range from 0.1 to 7.5 mole percent (0.1 to 12.0 weight percent).

The presence of iron in the calcium aluminate glass increases the stability of the melt, reduces its melting temperature and improves its handling properties. It is under such circumstances that the copper is found to be an added improvement. Established formulae for satisfactory batches containing varying amounts of iron which are improved by the present invention, are shown in the following table.

| Example | Molar ratio | | | | |
|---|---|---|---|---|---|
| | I | II | III | IV | V |
| $NaO_{0.5}$ | 5.0 | 7.5 | 7.5 | 7.5 | 7.5 |
| $KO_{0.5}$ | 2.5 | 2.5 | 2.5 | 2.5 | 2.5 |
| CaO | 32.5 | 32.5 | 32.5 | 30.0 | 2.3 |
| $AlO_{1.5}$ | 60.0 | 57.5 | 57.5 | 55.0 | 30.0 |
| MgO | 2.0 | 2.0 | 2.0 | 2.0 | 50.0 |
| BaO | 2.0 | 2.0 | 2.0 | 2.0 | 2.0 |
| $LaO_{1.5}$ | 2.0 | 2.0 | 2.0 | 2.0 | 2.0 |
| $SiO_2$ | 2.5 | 2.5 | 2.5 | 2.5 | 2.5 |
| $FeO_{1.5}$ | | 1.0 | 2.0 | 5.0 | 10.0 |

As the iron content increases in the glass, there is a corresponding decrease in both visible and infrared transmission. The following table compares the transmission through 2.0 mm. thick samples of the above examples at a number of selected wave lengths:

| Wave length ($\mu$) | Percentage transmission | | | | |
|---|---|---|---|---|---|
| | I | II | III | IV | V |
| 0.7 | 83 | 72 | 40 | 5 | 0 |
| 1.0 | 88 | 80 | 55 | 18 | 0 |
| 2.0–2.75 (max.) | 97 | 88 | 81 | 70 | 35 |
| 2.75–3.25 (min.) | 55 | 50 | 48 | 44 | 22 |
| 3.75–4.5 | 89 | 82 | 80 | 22 | 52 |

It may be seen that maximum transmission is achieved with the iron-free glass, while glasses containing iron, which are more stable, transmit less satisfactorily. The most satisfactory glasses are, therefore, a compromise. They contain sufficient iron to achieve stability while at the same time the iron is held to a minimum to obtain maximum transmission.

When copper is introduced into the iron-free calcium aluminate glass, a similar decrease in transmission is noted in the visible and near infrared regions (to $2.0\mu$) but not beyond the 2.0–2.75$\mu$ range. Examples of this are shown below by introducing $CuO_{0.5}$ additively in various amounts into the batch used as Example I (iron-free). The table shows the changes observed in the transmission through 2.0 mm. thick samples of the glasses used as examples.

| Example | Molar ratio | | |
|---|---|---|---|
| | VI | VII | VIII |
| $NaO_{0.5}$ | 5.0 | 5.0 | 5.0 |
| $KO_{0.5}$ | 2.5 | 2.5 | 2.5 |
| CaO | 32.5 | 32.5 | 32.5 |
| $AlO_{1.5}$ | 60.0 | 60.0 | 60.0 |
| MgO | 2.0 | 2.0 | 2.0 |
| BaO | 2.0 | 2.0 | 2.0 |
| $LaO_{1.5}$ | 2.0 | 2.0 | 2.0 |
| $SiO_2$ | 2.5 | 2.5 | 2.5 |
| $CuO_{0.5}$ | 0.1 | 0.5 | 1.0 |

| Wave length ($\mu$): | Percentage transmission | | |
|---|---|---|---|
| 0.7 | 33 | 5 | 0 |
| 1.0 | 52 | 20 | 4 |
| 2.0–2.75 (max.) | 87 | 87 | 87 |
| 2.75–3.25 (min.) | 55 | 55 | 55 |
| 3.75–4.5 (max.) | 82 | 82 | 82 |

The present invention is concerned with introduction of copper into the iron-containing calcium aluminate glasses. In general $CuO_{0.5}$ may be introduced into these glasses in amounts between 0.1 and 7.5 mole percent (0.1 and 12 wt. percent) as mentioned above. In glasses containing 3.5 mole percent (7 wt. percent) $FeO_{1.5}$ or less, $CuO_{0.5}$ in amounts beginning at .03 mole percent (.05 wt. percent) improves the transmission of the glass (particularly in the infrared region) until an optimum concentration of copper is introduced for each concentration of iron. At this point maximum transmission for a particular Cu:Fe ratio is obtained. As this optimum copper concentration is exceeded, the transmission of the glass again drops off until the maximum tolerable copper concentration is reached and glass stability is adversely effected. In glasses containing more than 3.5 mole percent (7 wt. percent) $FeO_{1.5}$, the introduction of small amounts of copper causes glass stability and transmission to deteriorate until a specific amount is reached (varying for each iron concentration). At this point the glass properties again improve until an optimum Cu:Fe ratio is reached. At this point maximum stability and transmission for each glass is attained both of which deteriorate as this point is passed until the limiting $CuO_{0.5}$ concentration is reached.

Specific examples of the phenomena described above are shown in the following tables. The tables indicate glass compositions containing varying iron concentrations into which $CuO_{0.5}$ has been introduced in varying amounts. The transmissions through these glasses are then compared at a number of selected wave lengths.

This reaction of iron and copper in the calcium aluminate glass has been used in two ways. First, satisfactory iron-containing calcium aluminate glasses previously produced have been improved with respect to both transmission and stability with optimum $Cu_2O$ additions, and second, new glasses containing optimum amounts of iron for maximum stability and improved handling properties have been developed with satisfactory transmission properties provided by the introduction of the proper amount of copper as determined above.

In defining the formulae the term "alkaline earth compounds" has been used to include magnesium, barium, and strontium. It should be understood, however, that zinc as well as small percentages of other oxides which are common in the glassmaker's art may be in- Molar ratio

| Example | IX | X | XI | XII | XIII | XIV | XV | XVI | XVII | XVIII | XIX | XX | XXI |
|---|---|---|---|---|---|---|---|---|---|---|---|---|---|
| $NaO_{0.5}$ | 7.5 | 7.5 | 7.5 | 7.5 | 7.5 | 7.5 | 7.5 | 7.5 | 7.5 | 7.5 | 7.5 | 7.5 | 7.5 |
| $KO_{0.5}$ | 2.5 | 2.5 | 2.5 | 2.5 | 2.5 | 2.5 | 2.5 | 2.5 | 2.5 | 2.5 | 2.5 | 2.5 | 2.5 |
| CaO | 32.5 | 32.5 | 32.5 | 32.5 | 32.5 | 32.5 | 30.0 | 30.0 | 30.0 | 30.0 | 30.0 | 30.0 | 30.0 |
| $AlO_{1.5}$ | 57.5 | 57.5 | 57.5 | 57.5 | 57.5 | 57.5 | 55.0 | 55.0 | 55.0 | 50.0 | 50.0 | 50.0 | 50.0 |
| MgO | 2.0 | 2.0 | 2.0 | 2.0 | 2.0 | 2.0 | 2.0 | 2.0 | 2.0 | 2.0 | 2.0 | 2.0 | 2.0 |
| BaO | 2.0 | 2.0 | 2.0 | 2.0 | 2.0 | 2.0 | 2.0 | 2.0 | 2.0 | 2.0 | 2.0 | 2.0 | 2.0 |
| $LaO_{1.5}$ | 2.0 | 2.0 | 2.0 | 2.0 | 2.0 | 2.0 | 2.0 | 2.0 | 2.0 | 2.0 | 2.0 | 2.0 | 2.0 |
| $SiO_2$ | 2.5 | 2.5 | 2.5 | 2.5 | 2.5 | 2.5 | 2.5 | 2.5 | 2.5 | 2.5 | 2.5 | 2.5 | 2.5 |
| $FeO_{1.5}$ | 1.0 | 1.0 | 1.0 | 2.0 | 2.0 | 2.0 | 5.0 | 5.0 | 5.0 | 10.0 | 10.0 | 10.0 | 10.0 |
| $CuO_{0.5}$ | 0.15 | 0.25 | 0.5 | 0.1 | 0.25 | 0.5 | 0.5 | 0.75 | 1.25 | 0.5 | 1.0 | 2.0 | 2.25 |

Percentage-transmission at different wave lengths:

| Example | $0.7\mu$ | $1.0\mu$ | Max. 2.0–2.75$\mu$ | Min. 2.75–3.25$\mu$ | Max. 3.75–4.5$\mu$ |
|---|---|---|---|---|---|
| II. (1 Fe) | 72 | 80 | 88 | 50 | 82 |
| IX. (1 Fe, 0.15 Cu) | 60 | 77 | 92 | 50 | 84 |
| X. (1 Fe, 0.25 Cu) | 39 | 61 | 91 | 50 | 83 |
| XI. (1 Fe, 0.5 Cu) | 9 | 30 | 89 | 50 | 82 |
| III. (2 Fe) | 40 | 55 | 81 | 48 | 80 |
| XII. (2 Fe, 0.1 Cu) | 57 | 73 | 85 | 51 | 80 |
| XIII. (2 Fe, 0.25 Cu) | 64 | 80 | 90 | 59 | 84 |
| XIV. (2 Fe, 0.5 Cu) | 30 | 55 | 88 | 56 | 80 |
| IV. (5 Fe) | 5 | 18 | 70 | 44 | 73 |
| XV. (5 Fe, 0.5 Cu) | 3 | 20 | 72 | 43 | 75 |
| XVI. (5 Fe, 0.75 Cu) | 17 | 61 | 87 | 52 | 81 |
| XVII. (5 Fe, 1.25 Cu) | 2 | 30 | 88 | 51 | 80 |
| V. (10 Fe) | 0 | 0 | 35 | 22 | 52 |
| XVIII. (10 Fe, 0.5 Cu) | 0 | 0 | 17 | 15 | 49 |
| XIX. (10 Fe, 1.0 Cu) | 0 | 0 | 3 | 3 | 49 |
| XX. (10 Fe, 2.0 Cu) | 0 | 7 | 62 | 45 | 73 |
| XXI. (10 Fe, 2.25 Cu) | 0 | 10 | 85 | 56 | 79 |

As may be seen by comparing the values in the above tables, Examples IX (1 Fe, 0.15 Cu), XIII (2 Fe, 0.25 Cu), XVI (5 Fe, 0.75 Cu), and XXI (10 Fe, 2.25 Cu) transmit superior to the Cu-free counterparts.

The following table indicates the change in transmission that occurs when the optimum amount of copper is introduced into each of the four examples of iron-containing calcium aluminate glass.

Comparative transmission:

| Example | $0.7\mu$ | $1.0\mu$ | Max. 2.0–2.75$\mu$ | Min. 2.75–3.25$\mu$ | Max. 3.75–4.5$\mu$ |
|---|---|---|---|---|---|
| II. (1 Fe) | 72 | 80 | 88 | 50 | 82 |
| IX. (1 Fe, 0.15 Cu) | 60 | 77 | 92 | 50 | 94 |
| Change in trans | −12 | −3 | +4 | | +2 |
| III. (2 Fe) | 40 | 55 | 81 | 48 | 80 |
| XIII. (2 Fe, 0.25 Cu) | 64 | 80 | 90 | 59 | 84 |
| Change in trans | +24 | +25 | +9 | +11 | +4 |
| IV. (5 Fe) | 5 | 18 | 70 | 44 | 73 |
| XVI. (5 Fe, 0.75 Cu) | 17 | 61 | 87 | 52 | 81 |
| Change in trans | +12 | +43 | +17 | +8 | +8 |
| V. (10 Fe) | 0 | 0 | 35 | 22 | 52 |
| XXI. (10 Fe, 2.25 Cu) | 0 | 10 | 85 | 56 | 79 |
| Change in trans | | +10 | +50 | +34 | +27 | cluded in the composition together with the alkaline earth compounds or in place thereof.

Glasses of the above formulae are satisfactorily produced in batches of convenient size. The batch is melted in a crucible at about 1500° C. The melting requires about four hours. The heat is then reduced to about 1400° C., and the melt stirred for about sixteen hours. Further moderate reduction in temperature follows and the glass is molded or sheeted. Annealing follows and the glass finally cooled gradually to room temperature.

The above is approximate, as the batches vary in operating conditions dependent upon the concentration of iron and alkalis.

The invention has been described in essence and by typical examples without limitation other than by the scope of the following claims.

What I claim is:

1. An iron-stabilized calcium aluminate glass for the transmission of infrared radiation produced from the oxides and ingredients of a raw batch composition consisting essentially of the oxides of calcium, aluminum, alkalis, and minor quantities of alkaline earth oxides, and also including approximately one mole percent of iron oxide in the form of $FeO_{1.5}$ and 0.15 mole percent of copper oxide in the form of $CuO_{0.5}$.

2. An iron-stabilized calcium aluminate glass for the transmission of infrared radiation produced from the oxides and ingredients of a raw batch composition consisting essentially of the oxides of calcium, aluminum, alkalis and minor quantities of alkaline earth oxides, and including approximately two mole percent of iron oxide in the form of $FeO_{1.5}$ and one quarter mole percent of copper oxide in the form of $CuO_{0.5}$.

3. An iron-stabilized calcium aluminate glass for the transmission of infrared radiation produced from the oxides and ingredients of a raw batch composition consisting essentially of the oxides of calcium, aluminum, alkalis, magnesium, barium, lanthanum and silicon, and including approximately one mole percent of iron oxide in the form of $FeO_{1.5}$ and 0.15 mole percent of copper oxide in the form of $CuO_{0.5}$.

4. An iron-stabilized calcium aluminate glass for the transmission of infrared radiation produced from the oxides and ingredients of a raw batch composition consisting essentially of the oxides of calcium, aluminum, alkalis, magnesium, barium, lanthanum and silicon, and including approximately two mole percent of iron oxide in the form of $FeO_{1.5}$ and 0.25 mole percent of copper oxide in the form of $CuO_{0.5}$.

References Cited in the file of this patent

UNITED STATES PATENTS

| | | |
|---|---|---|
| 1,331,937 | Luckiesh et al. | Feb. 24, 1920 |
| 1,403,752 | Enequist | Jan. 17, 1922 |
| 2,466,508 | Sun | Apr. 5, 1949 |
| 2,536,061 | Kahn | Jan. 2, 1951 |
| 2,685,526 | Labino | Aug. 3, 1954 |
| 2,774,675 | Slayter | Dec. 18, 1956 |
| 2,876,120 | Machlan | Mar. 3, 1959 |
| 3,007,804 | Kreidl et al. | Nov. 7, 1961 |

FOREIGN PATENTS

| | | |
|---|---|---|
| 797,573 | Great Britain | July 2, 1958 |

OTHER REFERENCES

"Optical and Physical Properties of Some Calcium Aluminate Glasses," in Journal of American Ceramic Society, vol. 41 (1958), pages 315–323.